T. A. EDISON.
Telephonic or Electro Harmonic Telegraphs.
No. 198,089. Patented Dec. 11, 1877.
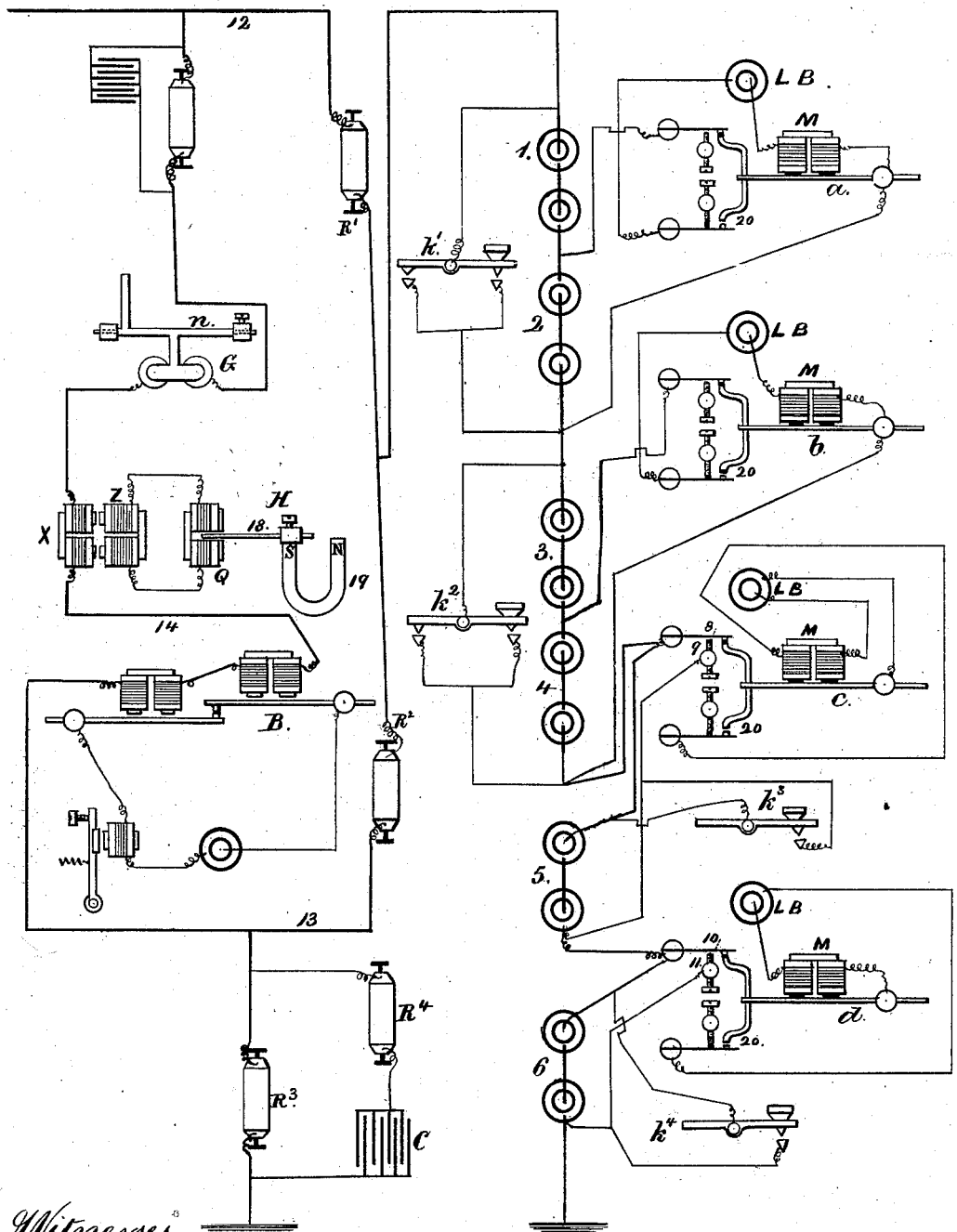

UNITED STATES PATENT OFFICE.

THOMAS A. EDISON, OF NEWARK, NEW JERSEY, ASSIGNOR TO THE WESTERN UNION TELEGRAPH COMPANY.

IMPROVEMENT IN TELEPHONIC OR ELECTRO-HARMONIC TELEGRAPHS.

Specification forming part of Letters Patent No. 198,089, dated December 11, 1877; application filed April 6, 1876.

*To all whom it may concern:*

Be it known that I, THOMAS A. EDISON, of Newark, in the county of Essex and State of New Jersey, have invented an Improvement in Duplex Telegraphs, of which the following is a specification:

I make use of reeds vibrating in different periods of time. They are each kept in vibration automatically by a magnet and local circuit, and send pulsations corresponding in time upon the main line. The batteries are each placed in the main line, and arranged so as to oppose each other. The receiving-instruments are placed in the bridge of a Wheatstone bridge, and balanced in relation to the outgoing current, and respond to the current from the distant station; and the receiving-instruments are peculiarly constructed, so as to respond to the transmitted pulsations.

$a$, $b$, $c$, and $d$ are the transmitting-reeds, each having a different vibrating time, and L B are the local batteries, and M the electro-magnets in the circuits of the respective batteries, by means of which the reeds are vibrated automatically, the local circuit at 20 being broken by the movement of the reed toward the magnet.

1 and 2 are batteries opposed to each other. The battery 2 is short-circuited by the contact-points upon the reed $a$ at every vibration, thus allowing the battery 1 to transmit a short wave over the main wire to the distant station. $K^1$ is a key, which only allows these waves to pass over the wire at the moment when its lever is passing from the back to the front contact-point, and in contact with neither. These short waves cause the receiving-reeds to open and close the sounder for a very short period of time, and allowing the signals to be read by the contact of the lever of the sounder upon its lower contact only.

3 and 4 are another set of batteries, operated in the same manner as 1 and 2, except that the reed $b$ makes a different number of vibrations per second than $a$.

$c$ and $d$ are two other reeds, each of which serves to break a short circuit around the batteries 5 and 6, thus allowing the current from 5 or 6 to pass over the line at the moment that 8 and 9 or 10 and 11 are separated from each other and the signaling-keys $K^3$ and $K^4$ are open.

$R^1$ $R^2$ and wires 12 and 13 form part of a Wheatstone balance.

14 is the bridge-wire, in which are placed the acoustic receiving-instruments G H B, operated by series of waves from the distant station. These reeds are in the bridge-wire, and the various resistance so adjusted that no currents from the batteries 1, 2, 3, 4, 5, and 6 pass through these instruments, but pass to the distant station to similar instruments in a bridge-wire of a Wheatstone balance.

$R^3$ is a resistance to balance the resistance of the line. $R^4$ is a resistance for increasing or decreasing the charging and discharging time of the equating-condenser C.

G is a receiving-instrument, which is worked by torsion.

$n$ is a metal bar, preferably round, securely clamped to two upright pillars, and provided with two projecting arms—one for operating the local-circuit devices, the other to secure an armature placed over an electro-magnet, which, acting on this armature, twists the bar. The twist, length, or size of the bar varies its periodic vibrating time. Hence it is very quickly adjusted by twisting it to the right or left and tightening its clamping-screw.

X is a magnet, placed in the main-line or bridge wire, with its cores facing those of a larger inductive magnet, Z, the wire upon which is connected to the magnet Q.

18 is a reed, polarized by the permanently-magnetized horseshoe-magnet 19. The passage of waves through X of one polarity causes positive and negative inductive currents to be thrown into Z and Q and causes the vibration of the reed 18.

B is a double-reed instrument, each of which is provided with an electro-magnet, and the extreme ends provided with contact-points. These reeds are tuned nearly alike, one being a little more flat than the other, so that its amplitude of vibration is not so great as the other. One part of the local circuit is connected to one reed, while the other part is connected to the other reed. This local circuit contains a battery and sounder.

When no waves periodic with the vibrating time of B are transmitted from the distant station, the points on the extreme ends of the reed are not in contact and the local circuit is open; but if a proper series of waves is sent, both reeds are set vibrating, and, as one has a slightly greater amplitude than the other, they come in contact, close the local circuit, and vibrate together as long as the proper waves come over the wire.

I claim as my invention—

1. The combination, in an acoustic telegraph, of opposing batteries, a vibrating reed, and a short circuit to one of the batteries, opened and closed by the action of such reed, substantially as set forth.

2. In an acoustic-telegraph instrument, a torsion-rod, $n$, and an electro-magnet for vibrating the same, substantially as set forth.

3. The combination, in an acoustic-telegraph instrument, of two reeds, one having a slightly different vibration from the other, and a local circuit to a sounder passing through such reeds, substantially as and for the purposes set forth.

Signed by me this 3d day of April, A. D. 1876.

THOS. A. EDISON.

Witnesses:
HAROLD SERRELL,
CHAS. H. SMITH.